(12) United States Patent
Tsukamoto

(10) Patent No.: US 6,785,563 B2
(45) Date of Patent: Aug. 31, 2004

(54) MOBILE TERMINAL OPERATING IN TELEPHONIC AND TACTILE MODES

(75) Inventor: Tadashi Tsukamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 462 days.

(21) Appl. No.: 09/851,162

(22) Filed: May 9, 2001

(65) Prior Publication Data

US 2001/0044328 A1 Nov. 22, 2001

(30) Foreign Application Priority Data

May 12, 2000 (JP) ........................................ 2000-139507

(51) Int. Cl.[7] .............................................. H04Q 7/20
(52) U.S. Cl. ....................................................... 455/567
(58) Field of Search ................................. 455/403, 407, 455/407.1, 407.2, 415, 423, 458, 456.1, 456.4, 550, 550.1, 550.2, 553.1, 564; 340/407.1, 407.2, 7.1, 7.57, 7.62, 7.6; 379/52, 102.02, 374.03

(56) References Cited

U.S. PATENT DOCUMENTS

| | | | | |
|---|---|---|---|---|
| 5,117,449 A | * | 5/1992 | Metroka et al. | 455/552.1 |
| 5,617,468 A | * | 4/1997 | Nojima et al. | 455/421 |
| 6,218,958 B1 | * | 4/2001 | Eichstaedt et al. | 340/7.6 |
| 6,411,198 B1 | * | 6/2002 | Hirai et al. | 340/7.6 |
| 6,574,489 B1 | * | 6/2003 | Uriya | 455/567 |

FOREIGN PATENT DOCUMENTS

| | | |
|---|---|---|
| JP | 10-23489 | 1/1998 |
| JP | 10-42024 | 2/1998 |
| JP | 10-108233 | 4/1998 |
| JP | 11-205221 | 7/1999 |
| JP | 2000-354089 | 12/2000 |

* cited by examiner

Primary Examiner—Sinh Tran
Assistant Examiner—Julio R Perez
(74) Attorney, Agent, or Firm—Foley & Lardner LLP

(57) ABSTRACT

In a mobile telephone terminal, a vibrator is provided for producing tactile sensation. In response to an input signal from a manual input device during a speech mode of communication, a vibrator-on signal is transmitted from the mobile telephone terminal to a mobile network. In response to the vibrator-on signal from the network, the vibrator is activated to produce tactile sensation. Preferably, a table memory is provided for mapping a number of signaling codes to a number of corresponding items of information. One of the signaling codes is selected in response to an input signal from the manual input device and the vibrator-on signal is transmitted to the network for indicating the selected signal code.

8 Claims, 2 Drawing Sheets

MOBILE TERMINAL OPERATING IN TELEPHONIC AND TACTILE MODES

BACKGROUND OF THE INVENTION

1. Field of the Invention

The present invention relates to a mobile telephone terminal for a mobile communication network.

2. Description of the Related Art

Recent mobile communications services have evolved to the point where mobile terminals are used as a tool for communicating a variety of multimedia information including text, video and voice.

However, the current mobile telephone terminal relies on human's auditory and visual perception. If a person is in a speech communication and suddenly encounters a situation where the communication cannot continue using auditory or visual perception, the person will be embarrassed if an instant reply is expected in response to an imminent question. Therefore, there is still a need to communicate in a different mode of human perception.

SUMMARY OF THE INVENTION

It is therefore an object of the present invention to provide mobile communication operating in a speech mode and a tactile mode.

According to the present invention, there is provided a mobile telephone terminal for use in a mobile communication network. The mobile telephone terminal comprises a wireless interface for establishing a communication link with the network, a vibrator for producing tactile sensation, a manual input device, and control circuitry responsive to an input signal from the manual input device during a speech mode of communication for transmitting a vibrator-on signal to the network via the interface and responsive to a vibrator-on signal received from the network via the interface for activating the vibrator to produce the tactile sensation.

Preferably, a table memory is provided for mapping a plurality of signaling codes to a plurality of corresponding items of information. The control circuitry selects one of the signaling codes in response to an input signal from the manual input device and transmits the vibrator-on signal to the network for indicating the selected signal code.

According to a second aspect, the present invention provides a method of communication for a mobile telephone terminal which establishes a wireless link with a mobile communication network, wherein the mobile telephone terminal includes a vibrator and a manual input device. The method comprises the steps of transmitting a vibrator-on signal from a mobile telephone terminal at a transmit site to the network in response to a signal from the manual input device of the terminal when speech communication is in progress via the wireless link, and receiving the vibrator-on signal from the network at a mobile telephone terminal at a receive site during the speech communication and activating the vibrator of the terminal.

BRIEF DESCRIPTION OF THE DRAWING

The present invention will be described in detail further with reference to the following drawings, in which.

DETAILED DESCRIPTION

Figure 1:
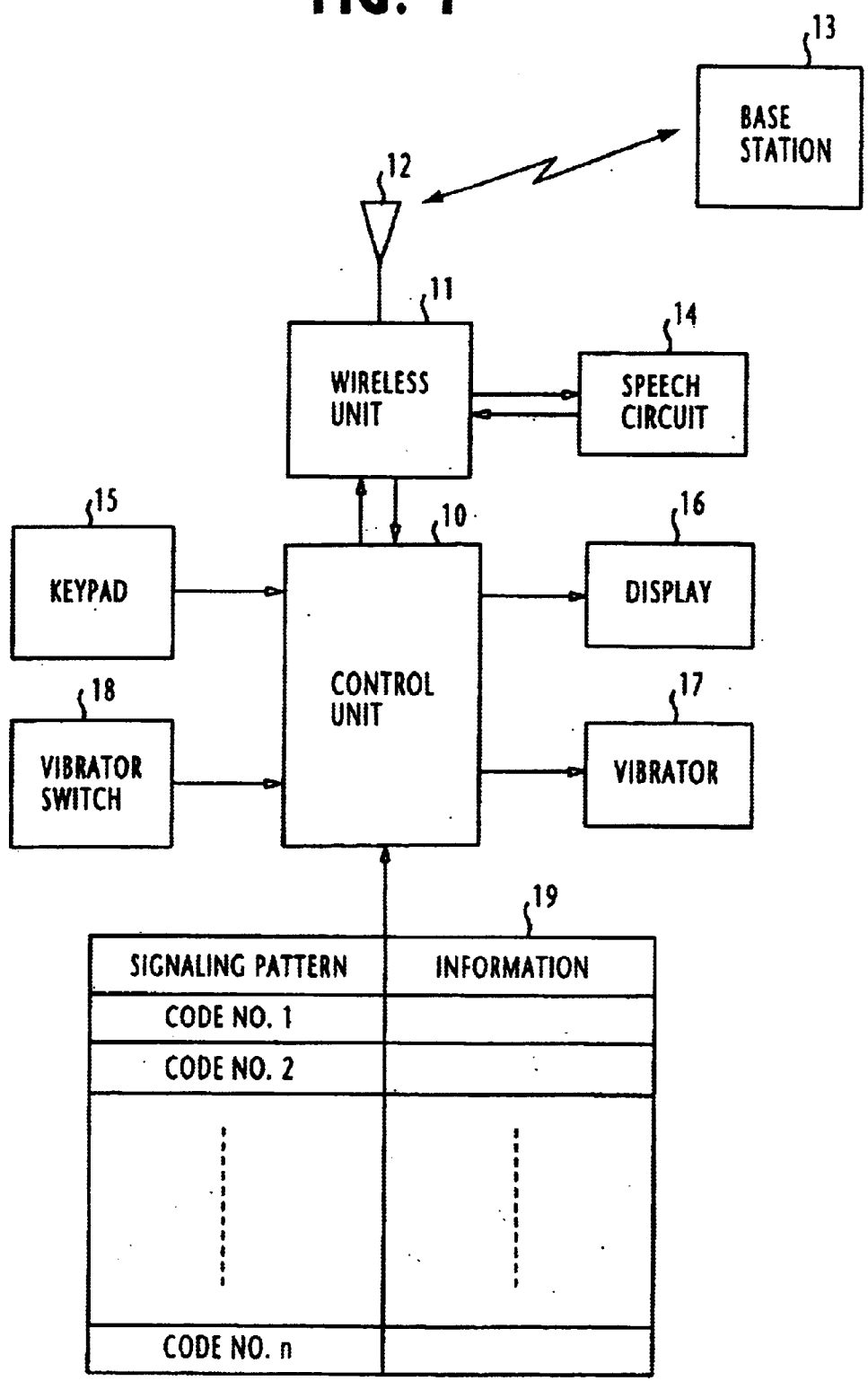
FIG. 1 is a block diagram of a mobile telephone unit according to the present invention.

Referring now to FIG. 1, there is shown a mobile telephone unit of the present invention for a cellular mobile communication network. The mobile unit is comprised of a control unit 10 and a wireless unit 11 which operates with an antenna 12 to interface to a base station 13 of the cellular mobile communication network to establish uplink and downlink channels for speech communication. A speech circuit 14 is connected to the wireless unit 11 for speech communication. A keypad 15 is used by the user of the mobile terminal to enter dialing or other information to the control unit 10. The information entered through the keypad 15 may be displayed on a display panel 16.

A vibrator 17 is provided for producing tactile sensation. Vibrator 17 is activated in response to the operation of a vibrator switch 18 or in response to a vibrator-on signal received from the network even though the switch 18 is in the OFF state. Preferably, a signaling table 19 is provided for mapping different signaling codes to corresponding items of information. Control unit 10 is connected to the signaling table 19.

Figure 2:
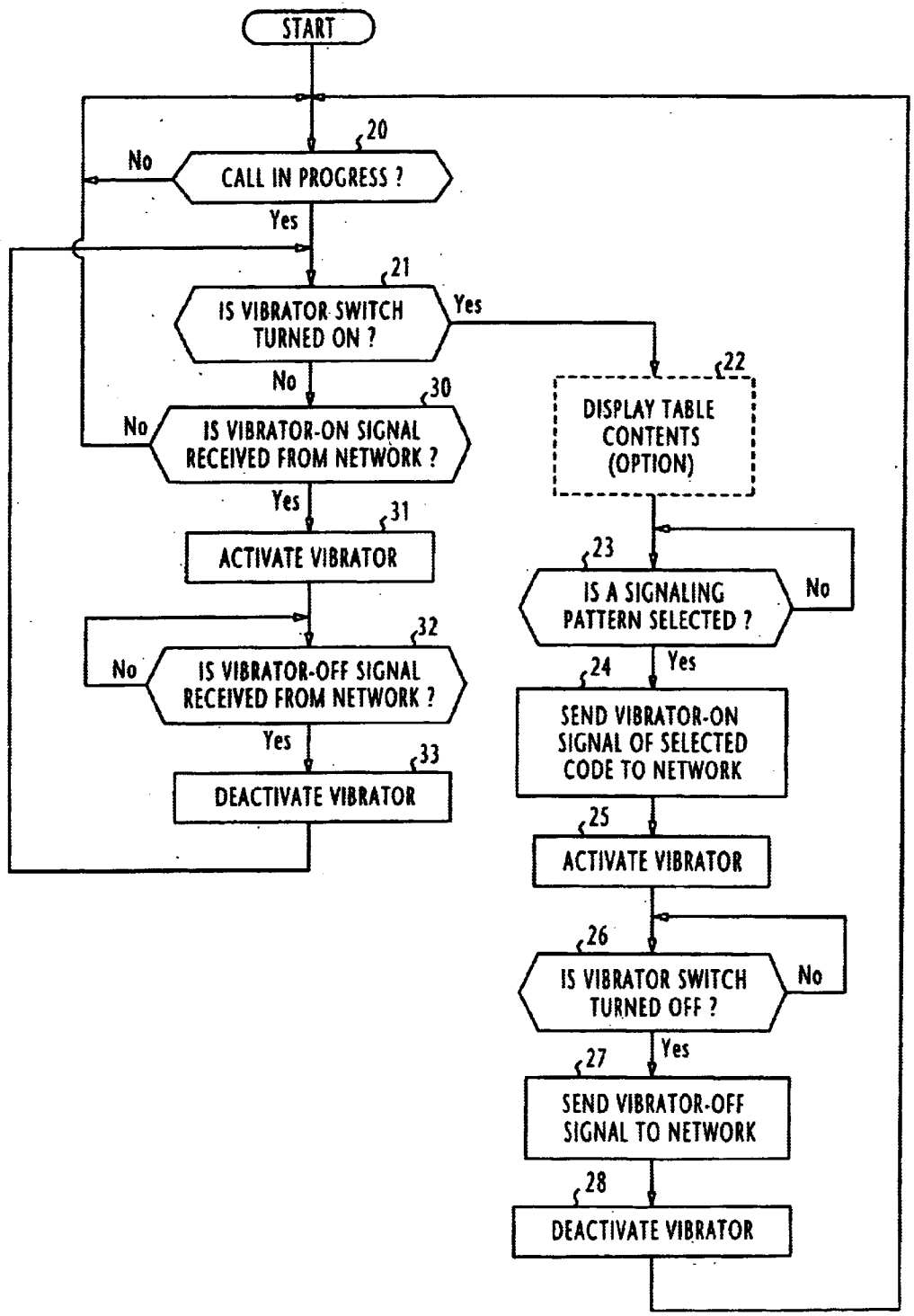
FIG. 2 is a flowchart of the operation of the control unit of the mobile telephone terminal.

The operation of the control unit 10 proceeds according to the flowchart of FIG. 2.

When a call of speech mode is in progress with a distant party through the base station 13 (step 20), the control unit 10 monitors the on-off state of the vibrator switch 18. If the vibrator switch 18 (step 21) is turned on by the user of the terminal, the control unit 10 recognizes it as an interrupt signal and flow proceeds to step 22 to display the contents of the signaling table 19 on the display panel 16 as an assistance to the user to subsequently operate the keypad 15 or the vibrator switch 18 for selection of a signaling code. In response to such a manual input, the control unit selects a corresponding signaling code from the table 19 (step 23) and applies the selected signaling code to the wireless unit 11. This signaling code is modulated onto the carrier currently established to the base station and transmitted to the network as a vibrator-on signal on the uplink channel of the speech communication (step 24). At step 25, the control unit 10 activates the vibrator 17 according to the selected signaling code. When the vibrator switch 18 is turned off (step 26), the control unit sends a vibrator-off signal to the network (step 27) and deactivates the vibrator 17 (step 28) and returns to the starting point of the routine.

When the vibrator switch 18 is in the OFF state during a call, flow proceeds from step 21 to step 30 to check to see if a vibrator-on signal is received from the network. If no vibrator-on signal is received when a call is in progress, steps 20, 21 and 30 are repeatedly executed. Therefore, if a vibrator-on signal is received during a speech-mode communication, flow proceeds from step 30 to step 31 to activate the vibrator 17 according to the signaling code of the received vibrator-on signal.

Therefore, the user at the receive end of the vibrator-on signal is alerted by the tactile sensation produced by the vibrator 17 and knows that the user at the other end of the network has encountered a situation where he is unable to continue the speech communication and knows from the pattern of the tactile sensation what he intends to communicate.

Control unit 10 then proceeds to step 32 to check for reception of a vibrator-off signal on the downlink channel of the speech communication. When the vibrator-off signal is received (step 32), the control unit deactivates the vibrator 17 (step 33) and returns to step 21. If the user at the receive end of the vibrator-on signal wishes to reply with a vibrator-on signal, the vibrator switch 18 will be operated and flow proceeds from step 21 to step 22 and the mobile terminal operates in a transmit tactile mode.

Note that step 22 may be dispensed with if the mobile terminal is used in such a situation where the use of display panel 16 is not appropriate. In this case, the communicating users have a set of agreed-upon signaling codes as a private protocol and remember these codes in their memory. Vibrator switch 18 may be of a push-button type to allow the user to press the button for a specified duration. By operating the button in a sequence of different durations a particular item of information can be transmitted.

What is claimed is:

1. A mobile telephone terminal for use in a mobile communication network, comprising:
   a wireless interface for establishing a communication link with said network;
   a vibrator for producing tactile sensation;
   a manual input device; and
   control circuitry responsive to an input signal from the manual input device during a speech mode of communication for transmitting a vibrator-on signal to the network via said interface and responsive to a vibrator-on signal received from the network via said interface for activating the vibrator to produce said tactile sensation.

2. The mobile telephone terminal of claim 1, wherein the control circuitry is configured to operate the vibrator in response to said input signal from the manual input device.

3. The mobile telephone terminal of claim 1, further comprising a table for mapping a plurality of signaling codes to a plurality of corresponding items of information, wherein said control circuitry is configured to select one of said signaling codes in response to an input signal from said manual input device and transmit said vibrator-on signal for indicating the selected signal code.

4. The mobile telephone terminal of claim 1, wherein said control circuitry is responsive to an input signal from the manual input device for transmitting a vibrator-off signal to the network via said wireless interface and responsive to said vibrator-off signal received from the network via said interface for deactivating the vibrator.

5. A method of communication for a mobile telephone terminal which establishes a wireless link with a mobile communication network, wherein the mobile telephone terminal includes a vibrator and a manual input device, the method comprising the steps of:
   a) transmitting a vibrator-on signal from a mobile telephone terminal at a transmit site to the network in response to a signal from the manual input device of the terminal when speech communication is in progress via said wireless link; and
   b) receiving the vibrator-on signal from the network at a mobile telephone terminal at a receive site during said speech communication and activating the vibrator of the terminal.

6. The method of claim 5, wherein the step (a) further comprises the step of activating the vibrator of the mobile telephone terminal at said transmit site in response to said signal from the manual input device.

7. The method of claim 5, wherein the mobile telephone terminal further comprises a table for mapping a plurality of signaling codes to a plurality of corresponding items of information, wherein the step (a) comprises the steps of selecting one of said signaling codes in response to an input signal from the manual input device of the transmit-site mobile telephone terminal and transmitting said vibrator-on signal for indicating the selected signal code.

8. The method of claim 5, further comprising the steps of:
   c) transmitting a vibrator-off signal from the transmit-site mobile telephone terminal to the network in response to a signal from the manual input device of the terminal; and
   d) receiving the vibrator-off signal from the network at the receive-site mobile telephone terminal during said speech communication and deactivating the vibrator of the terminal.

* * * * *